Aug. 11, 1942.          T. FLEWELLEN                2,292,994
                     COTTON PICKING MACHINE
                     Filed Jan. 14, 1942        4 Sheets-Sheet 1
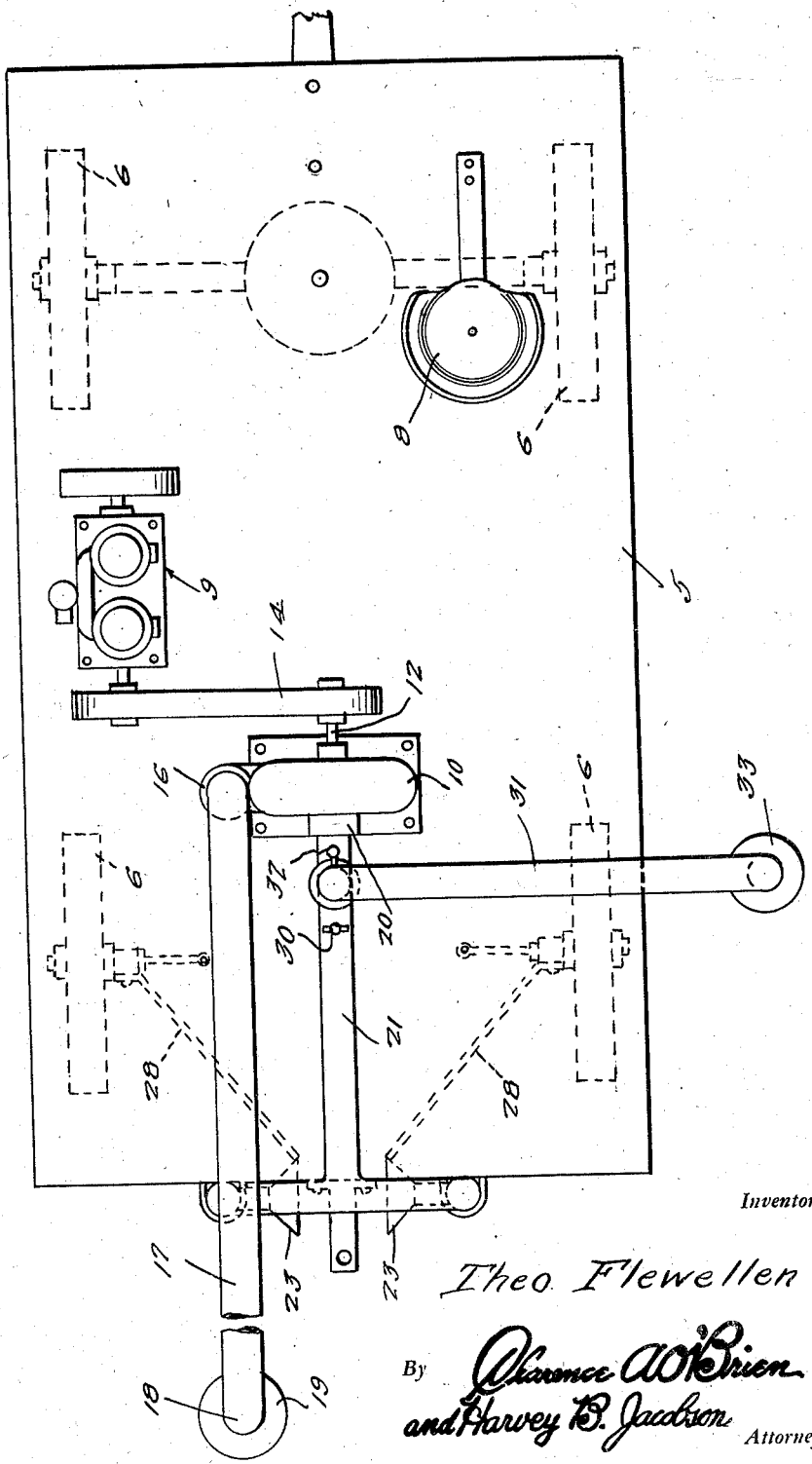
Inventor
Theo Flewellen
By Clarence A. O'Brien
and Harvey B. Jacobson
Attorney

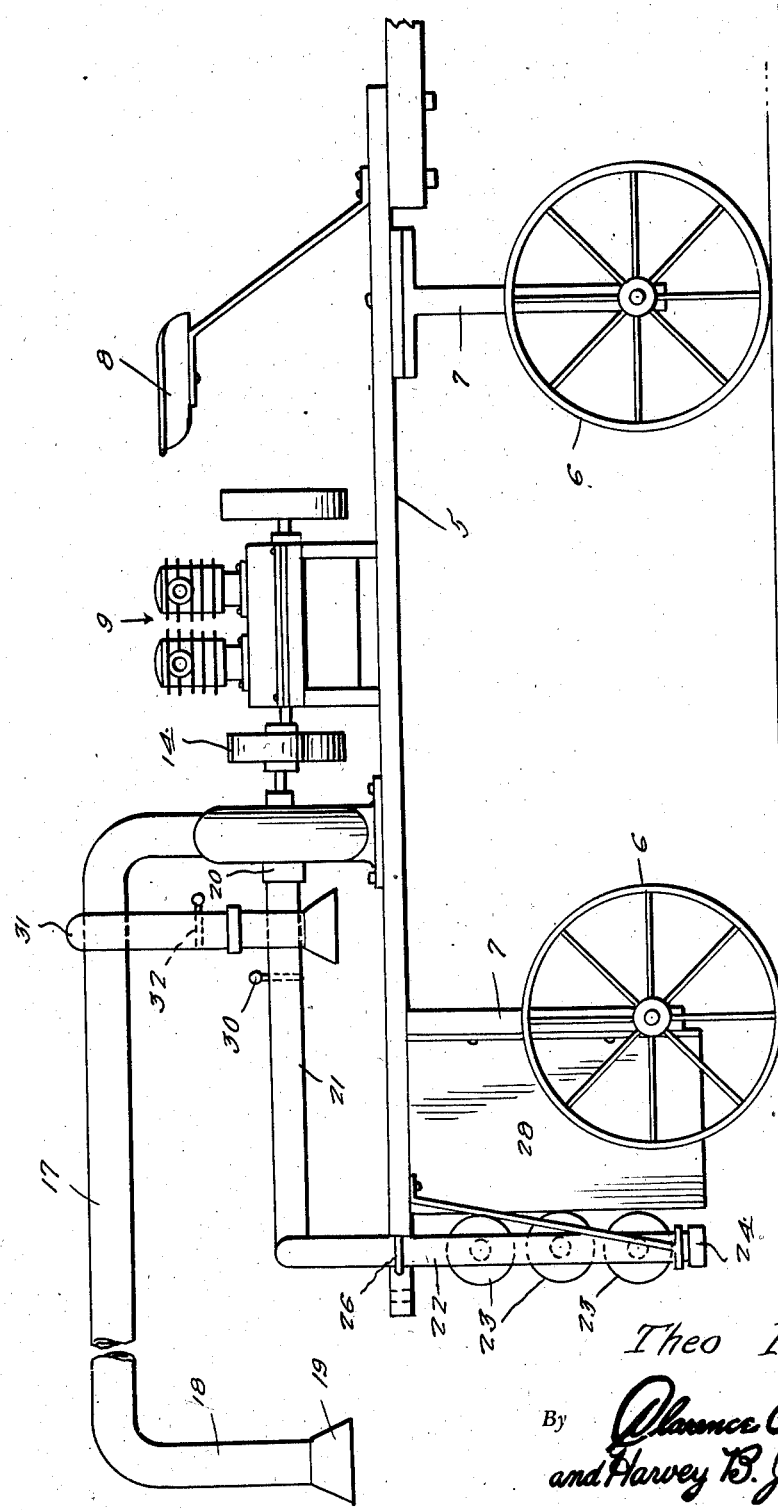

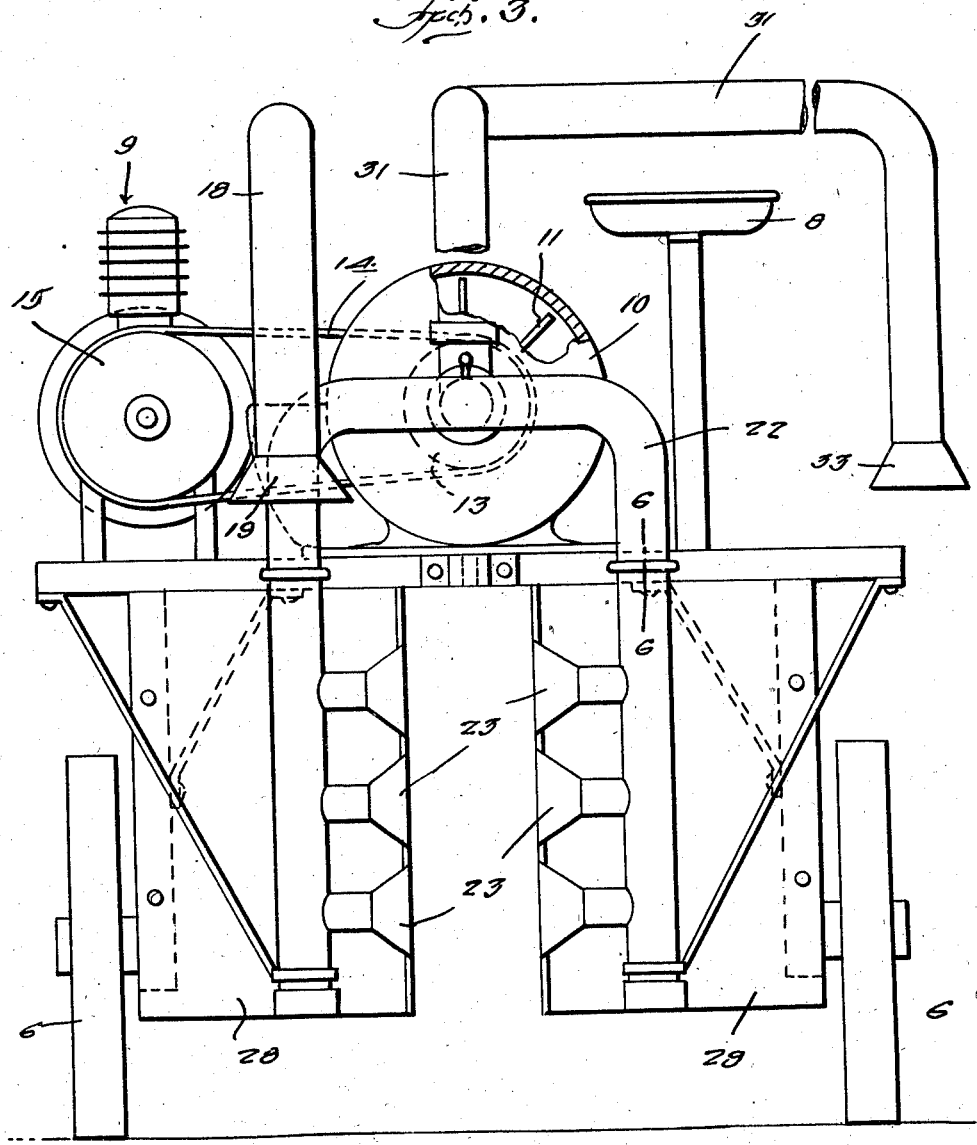

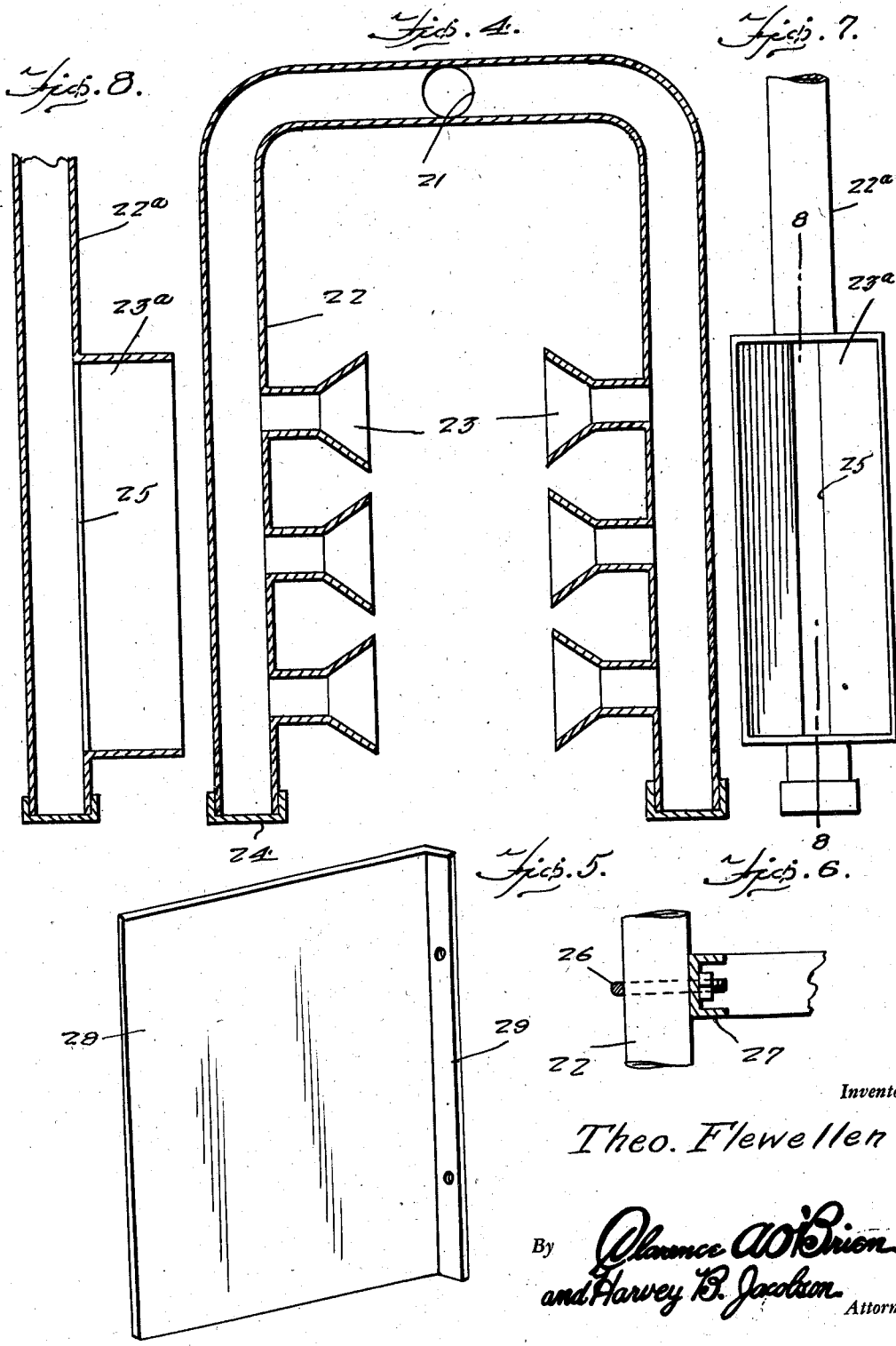

Patented Aug. 11, 1942

2,292,994

UNITED STATES PATENT OFFICE 2,292,994

COTTON PICKING MACHINE

Theo Flewellen, Hernando, Miss.

Application January 14, 1942, Serial No. 426,767

1 Claim. (Cl. 56—30)

This invention relates to new and useful improvements in machines for picking cotton.

The principal object of the present invention is to provide a cotton picking machine which will in operation serve to pick cotton without any manual effort required in the actual picking operation.

Another important object of the invention is to provide a cotton picking machine which will be labor saving in that the cotton is pulled directly from the growing plants by suction and discharged into bins or wagons without any direct manual assistance.

Various other important objects and advantages of the invention will become apparent to the reader of the following description.

In the drawings:

Figure 1 represents a top plan view of the machine.

Figure 2 is a side elevational view.

Figure 3 is a rear elevational view.

Figure 4 is a vertical sectional view through the intake manifold.

Figure 5 is a perspective view of one of the guide wings.

Figure 6 is a sectional view taken substantially on the line 6—6 of Figure 3.

Figure 7 is a fragmentary face elevational view of a modified form of mouth for the intake manifold.

Figure 8 is a sectional view taken substantially on the line 8—8 of Figure 7.

Referring to the drawings wherein like numerals designate like parts, it can be seen that numeral 5 denotes a platform or bed supported by wheels 6 located at the lower ends of supporting legs 7. At the forward end of the bed 5 is a seat 8 for the driver, while at the intermediate portion of the bed 5 is a power plant generally referred to by numeral 9.

In further carrying out the present invention, numeral 10 denotes a suction plant the impeller element 11 of which has a shaft 12 on which is a pulley 13. Over this pulley is trained a belt 14, which, in turn, is trained over a pulley 15 driven by the power plant 9. Thus the suction plant 10 is operated.

The suction plant 10 has an exhaust neck 16 from which extends a conduit 17 and it is preferable that this conduit be swively connected to the neck 16. The outer end of the conduit 17 has a downwardly disposed portion 18 terminating in a flared discharge apron 19.

Numeral 20 denotes an intake neck for the suction plant 10 and this has a conduit 21 connected therewith, this conduit 21 extending forwardly from an inverted U-shaped manifold structure 22, the leg portions of which have inwardly disposed and flared mouths 23, which obviously pass along opposite sides of a row of cotton plants to suck off the cotton bolls. The lower ends of the leg portions of the manifold 22 are capped or otherwise closed as at 24.

A modification of the mouths 23 is shown in Figure 7 where instead of having a plurality of mouths on each leg of the manifold 22a, a single flaring shell 23a is provided, flaring outwardly from an elongated vertical slit 25 in the corresponding leg of the manifold 22a.

U-clamps 26 secure the manifold 22 or manifold 22a to the frame 27 of the bed 5.

Rearwardly converging guide plates 28, 28 have their forward flanged edges 29 secured to the rear legs 7 and terminate at their rear edges in close proximity with the mouths 23 or the mouths 23a in order to guide the cotton plant directly in front of the said mouths 23 or 23a.

In the conduit 21 is a valve 30, while as shown in Figures 2 and 3, an upstanding and laterally disposed conduit 31 has a valve 32 therein. The conduit 31 is preferably swively connected to the conduit 21 and has a flared apron 33 at its outer end.

The conduit 17 can be swung to any position desired to reach a trailer or wagon.

The conduit 31 can be used for sucking cotton out of a trailer when transferring cotton from a trailer to large cotton wagons or trucks. Obviously, the valves 30 and 32 are operative depending upon which conduit is being used.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a cotton picking machine, a wheel supported platform, a suction manifold at the rear end of said platform of inverted U-shape and fixed to the platform in upright position to provide a pair of depending legs upon opposite sides of the line of draft, respectively, vertically spaced and flared suction members on the confronting sides of said legs extending laterally therefrom toward said line of draft, a suction plant on the platform forwardly of said manifold, a suction conduit extending from the top of said manifold to said plant, and a pair of vertically disposed plant deflecting plates depending from the bottom of said platform in front of said legs, respectively, and converging rearwardly to the outer ends of said members.

THEO. FLEWELLEN.